Fig. 1

W. C. FARNUM.
ATTACHMENT FOR CUTTING TEETH OF BEVEL GEARS.
APPLICATION FILED DEC. 23, 1918.

1,373,958.

Patented Apr. 5, 1921.

UNITED STATES PATENT OFFICE.

WILLIAM C. FARNUM, OF WINCHENDON, MASSACHUSETTS.

ATTACHMENT FOR CUTTING TEETH OF BEVEL-GEARS.

1,373,958.   Specification of Letters Patent.   Patented Apr. 5, 1921.

Application filed December 23, 1918. Serial No. 267,887.

*To all whom it may concern:*

Be it known that I, WILLIAM C. FARNUM, a citizen of the United States, residing at Winchendon, county of Worcester, and State of Massachusetts, have invented an Improvement in Attachments for Cutting Teeth of Bevel-Gears, of which the following description, in connection with the accompanying drawings, is a specification, like characters on the drawings representing like parts.

The invention to be hereinafter described relates to machines for forming the teeth of gears and the like.

In my copending application, Serial No. 248,306, filed August 5, 1918, is shown, described and claimed a machine for generating the curved teeth of spur gears, comprising a standard supporting a spindle for a rotary cutter, and a knee having a table thereon adapted to receive a frame carrying an arbor for the gear blank to be acted upon by the cutter. A master gear on the arbor meshes with a fixed rack above the cutter, the construction being such that in the course of the traverse of the table the master gear will roll along the rack and the gear blank will roll along the cutter and an involute tooth space will be produced in the blank. After each tooth space is cut, and the master gear has rolled from the teeth of the rack, an indexing rack acts on the master gear and turns the same sufficiently to index the blank.

One of the objects of the present invention is to provide an attachment which may be mounted on the table in place of the frame referred to, and appropriately support a blank in position to produce a bevel gear.

Another object of the invention is to provide a curved rack above the cutter to mesh with a master gear on the arbor carrying the gear blank, in order that the blank may be properly rolled over the cutter to generate involute teeth on the blank.

And another object of the invention is to provide a simpler mechanism than that disclosed in said application for indexing the blank.

With the aforesaid and other objects in view, the character of the invention will be best understood by reference to the following description of embodiments thereof shown in the accompanying drawings, wherein:—

Fig. 2 on an enlarged scale is an end elevation of a portion of the machine shown in Fig. 1;

Figs. 2ª and 2ᵇ are side and face views of a collar for the arbor;

Referring to the drawings, the machine shown therein as embodying the invention comprises a base 1 (Fig. 1) having a standard 3 rising therefrom carrying an adjustable head 5 for a spindle 7 having a rotary cutter 9 (Fig. 2) on the forward end thereof suitably formed to produce involute tooth spaces in a blank. The spindle is driven from the main shaft 11 having stepped pulleys 13 thereon, suitable gearing (not shown) being provided between the main shaft and the spindle.

At the front end of the standard is a knee 15 which may be adjusted vertically and angularly with respect to the standard, and may be held thereto by clamping bars 17.

Since the mechanism thus far described is similar to the mechanism disclosed in my said application, further showing and description thereof will be unnecessary herein.

Mounted on the knee is a table 19 having a dovetail portion 21 adapted to slide in a similarly shaped groove 23 in the knee. To feed the table, a screw 25 (Figs. 1 and 3) may be mounted in bearings in the knee and have a gear 27 fast thereon meshing with a pinion 29 fast on a shaft 31 mounted in bearings 33 carried by the knee. A pair of bevel gears 35 and 37 on the shaft 31 mesh with a bevel gear 39 fast on a stub shaft 41 connected by a universal joint 43 with a shaft 45 splined to and telescoping with a sleeve shaft 47 connected by a universal joint 49 with a stub shaft 51 journaled in a bearing 53 on the standard and driven from the main shaft 11 by a gear train including gears 55 and 57. The construction is such that the bevel gears 35 and 37 may be driven in opposite directions in various positions of vertical and angular adjustment of the knee.

To connect the bevel gears 37 and 39 alternatively with the shaft 31, a double clutch member 59 (Fig. 1) may be splined to the shaft 31 between said gears, and may be shifted by a yoke 61 on a rod 63 adapted to slide in bosses 65 projecting from the bearings 33 referred to. A lug 67 (Figs. 1 and 3) fast on the rod 63 has a wedge-shaped end adapted to engage the wedge-shaped end 69 of a plunger 71 reciprocable in guides 73 and 75 carried by the knee. A coil spring 77 encircles the plunger, and is confined between a collar on the plunger and an adjusting sleeve 79 threaded in the guide 75.

Slidably mounted on the rod 63 is a U-shaped member 81 having a pair of coil springs 83 confined between the legs of said U-shaped member and a lug 85 fast on said rod. A spur 87 on said U-shaped member is adapted to be engaged by either of a pair of dogs 89 and 91 adjustably secured by screws 93 to a horizontal bar 95, H-shaped in section and projecting into a horizontal T-shaped slot in the front face of the table.

Figure 1:
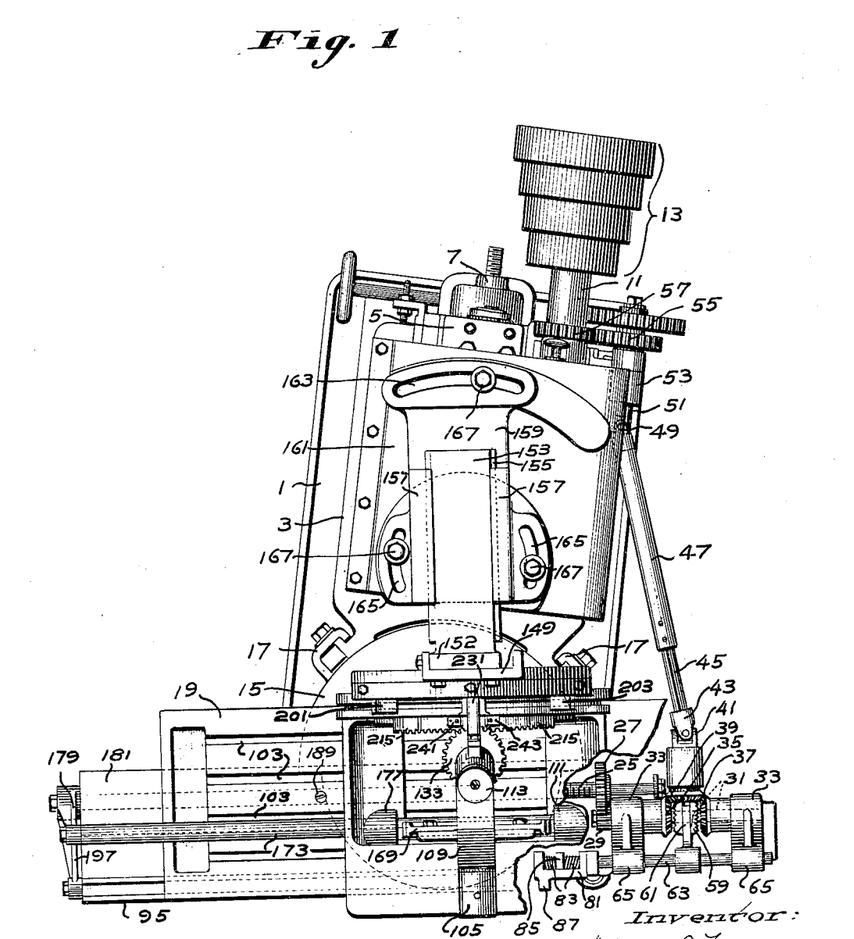
Figure 1 is a plan of a machine embodying the invention.
Figure 3:
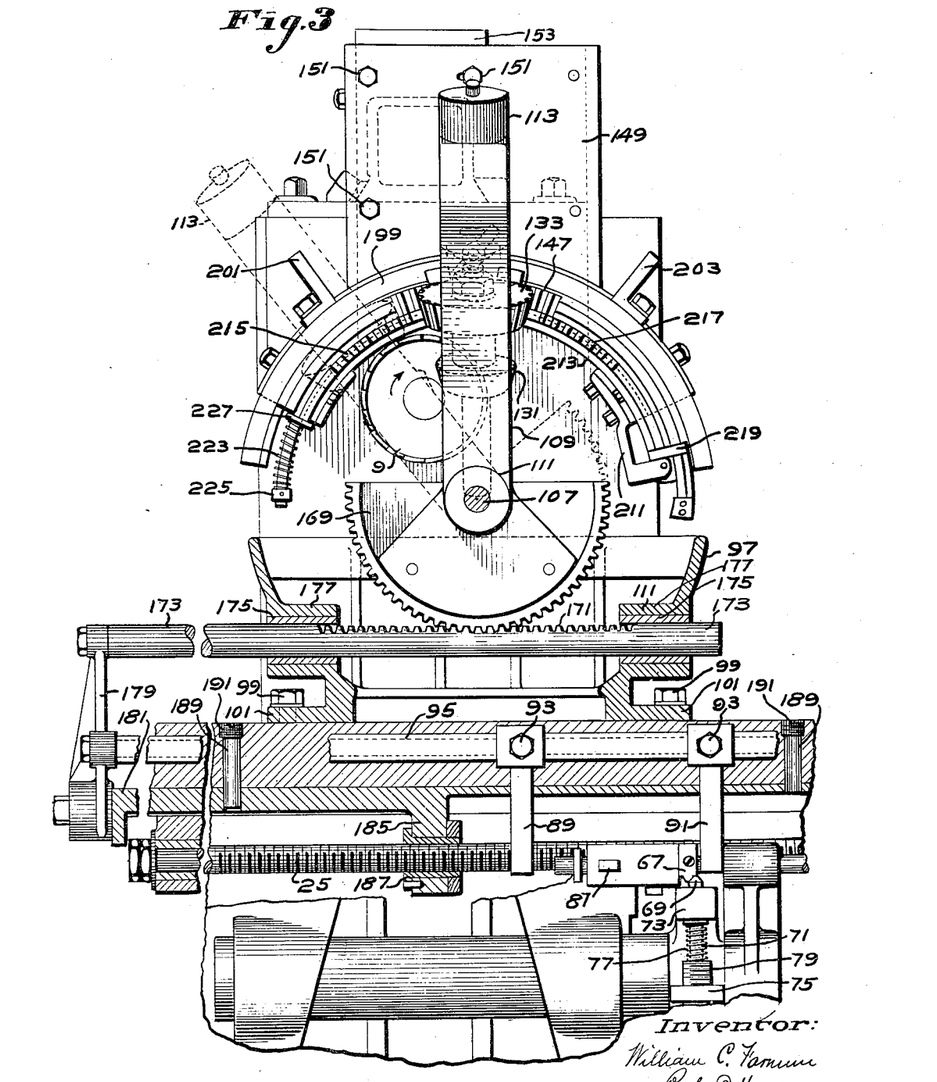
Fig. 3 is partly a front elevation of parts shown in Fig. 2, and partly a section taken on the broken line 3—3 of Fig. 2.
Figure 4:
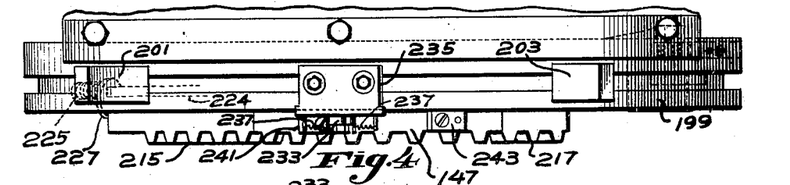
Fig. 4 is a plan of the indexing mechanism.

The construction is such that in the course of the travel of the table toward the right of Figs. 1 and 3, the dog 89, for example, will engage the spur 87 and slide the U-shaped member 81 somewhat along the rod 63, thereby compressing one of the springs 83 and causing the wedge-shaped end of the lug 67 to ride over a similarly shaped end of the plunger 71. After it passes the high point of the plunger, the spring 83 energized as described, will be released and become effective to shift the rod 63 farther to the right, and as a consequence, the double clutch member 59 will be disconnected from the bevel gear 39 and connected to the bevel gear 37, thereby changing the direction of travel of the table. Similarly, when the table is traveling toward the left of Figs. 1 and 3, the dog 91 will engage the spur 87 of the U-shaped member 81, and compress the other spring 83 and shift the clutch member to disconnect the same from the bevel gear 37 and connect the same with the bevel gear 39, thereby causing the table to feed in the opposite direction.

Next will be described the frame or support for the arbor carrying the bevel gear blank to be acted upon by the cutter. This frame or support, in the present instance of the invention, comprises a base 97 (Figs. 1, 2 and 3) adapted to be mounted upon the table and be secured thereto by bolts 99 entered through flanges 101 on said base, and having their heads entered into T-shaped slots 103 formed in the top of the table. The base 97 may be hollowed to have the dished form shown in Fig. 3, and may have bearings 105 mounted thereon adapted to receive a rock shaft 107. An elbow-shaped arm 109 has bosses 111 fast on said rock shaft, and a boss 113 adjacent the upper end of said arm receiving a tail spindle 115 having a conical center 117. The boss 113 may be split and clamped to the tail spindle 115 by a screw bolt 119. A stud 121 may be mounted in a boss 123 on the base 97, and have a head 124 threaded in a counter-bore in said boss. The stud 121 is formed to present a bearing ball 127 at one end thereof, and is secured by a set screw 128 in said boss. This bearing ball is preferably supported with its center in alinement with the axis of the shaft 107.

Figures 2, 2A, 2B:
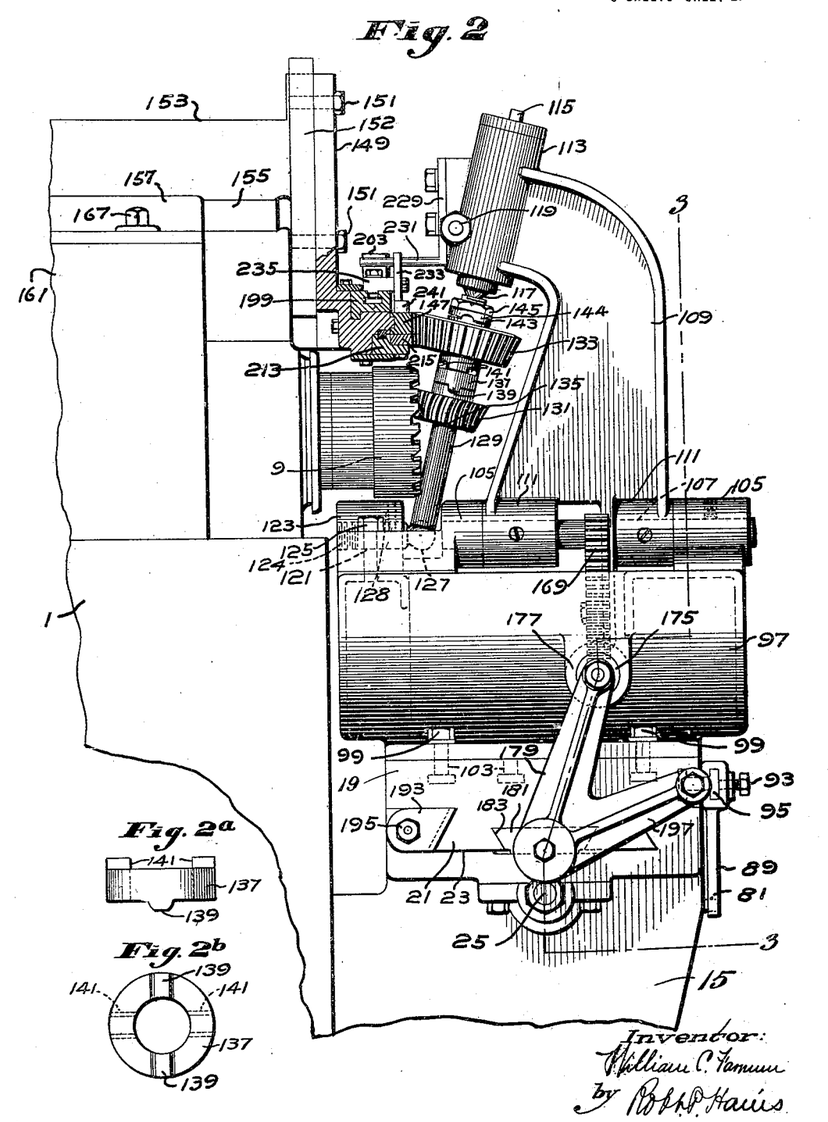

The tail spindle, conical center 117, and the ball 127 are adapted to receive between them an arbor 129 serving to support a bevel gear blank 131 and a bevel master gear 133. Suitable means may be provided to secure the blank and master gear on the arbor. In the present instance, the blank rests against a shoulder 135 formed on the arbor, and said blank and master gear are spaced by a loose collar 137 (Figs. 2ª and 2ᵇ) having ribs 139 seated in grooves in the hub of the blank, and transverse ribs 141 seated in grooves in the hub of the master gear. A similar collar 143 is confined between the master gear and a washer 144 engaging a nut 145 on the arbor, having a socket to receive the conical center of the tail spindle 115.

The construction is such that the collars may be susceptible of slight rocking movement with respect to the arbor to compensate for any inaccuracies in the faces of the hubs of the gear blank and master gear, and thereby prevent side strain on the arbor when the blank and master gear are clamped thereon. Also, the construction is such that the gear blanks may be quickly and easily applied to and removed from the arbor.

Coöperating with the master gear is a curved rack 147 (Figs. 2, 3 and 5) secured to a vertical plate 149 adapted to be connected by screw bolts 151 with the front plate 152 of a slide 153 (Fig. 1) having a dovetail base 155 adjustably mounted in guides 157 on a plate 159 mounted on a hood 161 covering the cutter spindle.

It is desirable that the curved rack 147 may be susceptible of angular adjustment to correspond with the angular adjustment of the knee referred to. To accomplish this, the plate 159 supporting the slide 153 may have arcuate slots 163 and 165 therein receiving screw bolts 167 tapped into holes in the top of the hood. The construction is such that the bolts 167 may be released and the plate 159 may be angularly adjusted as required. Then the bolts may be tightened again to secure the plate in position.

Suitable means may be provided to oscillate the elbow arm 109 and the arbor 129 about the axis of the shaft 107, referred to, to cause the master gear to roll along the curved rack and to cause the bevel gear blank to roll over the cutter, in order that an involute tooth space may be formed in the blank. This means, in the present instance of the invention, comprises a toothed sector 169 fast on the shaft 107 and projecting down into the dished base 97 referred to, where said sector meshes with a rack 171 on a bar 173 adapted to slide longitudinally in bushings 175 in boss bearings 177 formed on said base 97.

One end of the bar 173 may be connected by an arm 179 with a dovetail slide 181 mounted in a similarly shaped groove 183 in the under face of the table. This slide has a lug 185 (Fig. 3) depending therefrom and carrying a nut 187 on the table feed screw shaft 25, referred to.

Suitable means may be provided detachably to connect the slide 181 with the table. To accomplish this, in the present instance, a pair of pins 189 are adapted to be dropped into registering vertical holes in the table and slide. The upper ends of these pins may be enlarged to form screw heads 191 which may be threaded in counterbores in the table to secure said pins in position.

Suitable means may be provided to detachably secure the table to the knee. To accomplish this, a tapered gib 193 (Fig. 2) may be provided and controlled by an adjusting screw 195.

When the attachment for supporting the bevel gear blanks is mounted on the table, the tapered gib 193 is tightened to secure the table to the knee, and the pins 189 are removed. Thereupon, when the table feed screw 25 is rotated, the slide 181 will be fed longitudinally, and through the arm 179 will slide the rack bar 173, thereby rocking the toothed sector 169 and the elbow arm 109 carrying the arbor. The rocking of the arbor will cause the master gear to roll along the curved rack and cause the gear blank to roll across the face of the cutter, thereby producing an involute curved tooth space in the blank.

After one tooth space has been formed, the elbow arm and arbor should be rocked in the opposite direction to roll the master gear over the curved rack, and to roll the gear blank across the cutter to generate the next tooth space in the blank. To reverse the direction of feed of the slide 181 for this purpose, it may be connected by an arm 197 with one end of the bar 95 referred to, carrying the dogs 89 and 91 which coöperate with the device for shifting the clutch member 59 for changing the direction of rotation of the table feed screw shaft. The construction is such that when the dogs 89 and 91 are adjusted to their appropriate positions on the bar 95, they will automatically change the direction of feed of the slide 181 and change the direction in which the elbow arm and arbor are rocked. Thus, said arm and arbor will be continuously oscillated to move the blank across the cutter and generate successive involute tooth spaces in the blank.

After a tooth space has been formed in the blank, the master gear and blank should be indexed or turned an increment to present the blank in proper position with respect to the cutter to have the next tooth space formed therein. To accomplish this, in the present instance, a curved slide 199 (Figs. 3 and 5) is mounted on the carrier for the master gear rack 147 and adapted to slide in a suitable guideway. This curved slide has a pair of dogs 201 and 203 secured thereto, and one end of the slide is connected to a rack 205 meshing with a pinion 207 on a shaft 209 mounted on an arm 211 secured to the carrier for the master gear rack. A curved slide 213 is mounted in a suitable guideway in said carrier, and has secured thereto a pair of indexing racks 215 and 217. One end of the slide 213 has a head 219 engaged by a cam 221 fast on the pinion shaft 209. The head 219 is pressed against said cam by a coil spring 223 encircling a curved arm 224 on the carrier and confined between a collar 225 secured to said arm, and a head 227 on the slide 213.

Secured to the elbow arm 109 for the arbor is a bracket 229 (Fig. 2) having an arm 231 projecting therefrom in line with the dogs 201 and 203 on the cam actuating slide 199.

The construction is such that in the course of the oscillation of the arbor arm 109, the bracket arm 231 will engage the dog 201 and shift the slide 199 and cause the rack 205 to turn the pinion 207 and cam 221. The latter will then act on the head 219 and shift the index slide 213 to the left of Fig. 5 sufficiently to impart an indexing movement to the index rack 215. This indexing movement, however, will not occur until after the master gear has rolled from its rack 147 to the indexing rack 215. The movement of the indexing rack is sufficient to turn the master gear and blank a proper increment, so that when the master gear is rolled back onto its rack, the blank will be in a position to have the next tooth space formed therein by the cutter.

The direction of rocking movement of the arbor arm is changed automatically as described to cause the master gear to roll back from the indexing rack onto the master gear rack. While the master gear rolls along its rack, it is desirable to return the slide for the indexing racks to its original position, in order that it may again be shifted to the left of Fig. 5 in the same direction as before, in order to again index the blank when the master gear has rolled from its rack onto the indexing rack 217. To accomplish this, in the present instance, a lever 233 may be pivotally mounted on a pin 235 on the cam actuating slide 199, and may be normally held in vertical position by a pair of coil springs 237 connected to a hub 239 on said lever and to points on the slide. This lever works between a pair of lugs 241 and 243 mounted on the carrier for the master gear rack. The construction is such that as the arbor carrying arm rocks toward the right of Fig. 5, the bracket arm 231 will engage the lever 233 and rock the same in a clockwise direction from its position shown in full lines to its position shown in dotted lines in Fig. 5. In the course of this movement the lower end of said lever will react against the fixed lug 241 and shift the cam actuating slide toward the right of said figure. This will allow the spring 223 to return the index rack slide to its original position.

The arbor carrying arm continues to rock toward the right of Fig. 5, and eventually engages the dog 203 and slides the rack 205 toward the right of Fig. 5, thereby again turning the pinion 207 and cam 221 and shifting the head 219 and index rack slide to the left of Fig. 5. Before the bracket arm 231 engages the dog 203, the master gear will have rolled from its rack 147 onto the index rack 217. As a consequence, the shifting of the latter will index the master gear and blank, so that when the master gear rolls back on its rack 147, the blank will be in a position to have the next tooth space formed therein by the cutter.

It will be noted that the cam 221 is rocked in opposite directions in the two indexing movements at the opposite ends of the oscillatory movement of the arbor arm, but the shape of the cam is such that it always shifts the index rack slide in the same direction.

Figure 5:
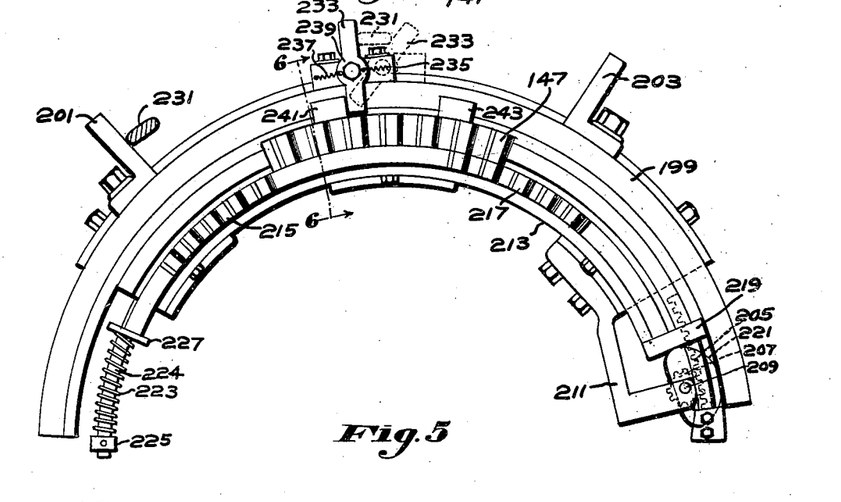
Fig. 5 is a front elevation of the mechanism shown in Fig. 4.
Figure 6:
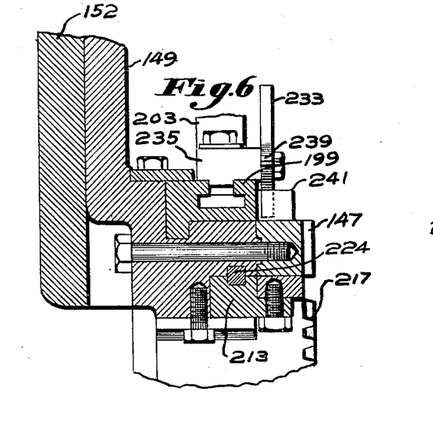
Fig. 6 on an enlarged scale is a vertical section taken on line 6—6 of Fig. 5.
Figure 7:
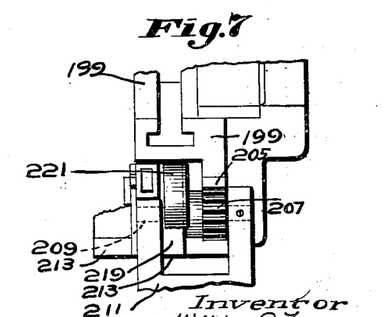
Fig. 7 on an enlarged scale is an end view of parts shown in Figs. 4 and 5.

In the course of the rocking of the arbor arm toward the left of Fig. 5, the bracket arm 231 will engage the lever 233 and cause the same to react against the lug 243 to return the cam actuating slide 199 to its original position in readiness to perform the next indexing operation.

When it is desired to adapt the machine to form the teeth of bevel gears, it is merely necessary to mount the arbor carrying frame on the table, mount the master gear rack and indexing mechanism carrying plate 149 on the slide 153, lock the table to the knee, and release the slide 181 from the table.

When it is desired to remove the attachment for producing bevel gears from the machine, and it is desired to feed the table, the pins 189 are dropped into position to connect the slide 189 with the table, and the tapered gib 193 is released. Then the slide 181 and table may be fed as a unit through the nut 187 carried by the slide and working on the table feed screw shaft.

Figure 8:
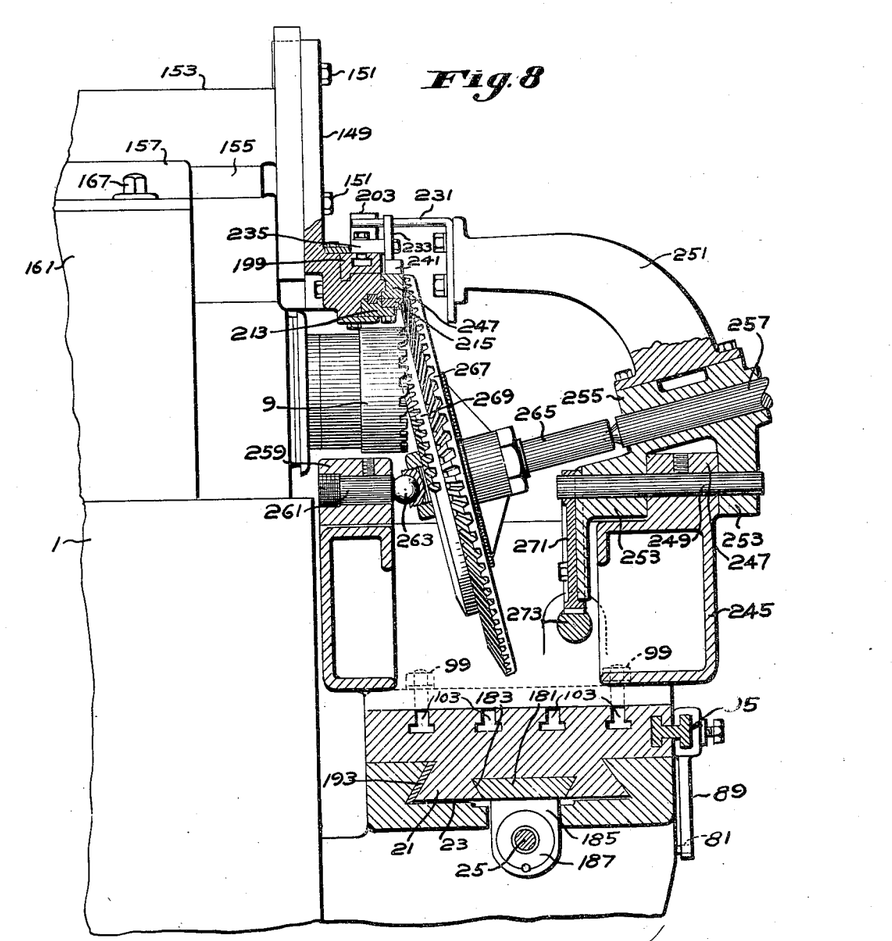
Fig. 8 is a view partly in vertical section and partly in elevation of a modified form of the invention.

In Fig. 8 a modified form of attachment is shown suitable for the production of bevel gears larger than that already described. This attachment comprises a base 245 detachably secured to the table and formed to present a bearing 247 receiving a rock shaft 249. An elbow arm 251 has bosses 253 at its lower end fast on the rock shaft. The arm is formed to present a split boss 255 adjacent the rock shaft and adapted to receive a tail spindle 257. The base 245 also carries a boss 259 receiving a stud 261 having a bearing ball 263 at one end thereof and preferably with its center in alinement with the axis of the shaft 249. The arbor 265 is mounted between the tail spindle and the bearing ball, the obliquity of the arbor being suitable to properly position the master gear 267 with respect to its rack, and to properly position the large bevel gear blank 269 with respect to the cutter. A toothed sector 271 fast on the rock shaft 249 meshes with the rack on the bar 273 which is reciprocated to oscillate the arbor arm 251 to generate involute tooth spaces in a manner similar to that already described.

The operation of the gear cutting machine attachment herein described is such that the arbor 129 carrying the bevel gear blank is supported at the desired angle relative to the axis of the rotating cutter, and the elbow shaped arm 109 which supports one end of the arbor is rocked through a sufficient arc to move the gear blank from one side of the cutting teeth out of engagement with the same, across the cutting teeth to a similar position upon the other side of the same. In this manner the blank, upon the completion of the cutting of a tooth space therein is moved out of engagement with the cutter so that the blank may be rotated sufficiently to bring the space for the next tooth in position to be cut. The indexing of the blank occurs when the elbow arm 109 has been rocked either to the right or to the left of the cutting teeth, and this is very desirable since it causes a tooth to be cut in the blank each time the same is moved across the cutter teeth; that is, a tooth is cut each time the elbow arm 109 is moved either to the right or the left, past the cutter teeth. The arbor 129, in addition to being swung bodily past the cutter teeth, is rotated about its longitudinal axis through the coöperating master gear and rack 147, and this rotation serves to give the faces of the teeth the desired involute curve. The desired rocking motion is imparted to the elbow arm 109 by means of the sliding rack 173 which meshes with the toothed sector 169, and the necessary movement is imparted to the rack by the slide 181 having the nut engaging the feed screw 25.

It is believed that the operation of the machine will be readily understood without further explanation thereof.

Having described selected embodiments of the invention without limiting the same thereto, what I claim as new and desire to secure by Letters Patent is:—

1. In a machine of the character described, the combination of a rotary cutter, a curved rack, a curved indexing rack, an arbor to receive a gear blank, a master gear on said arbor, means to oscillate said arbor to roll said master gear to and from said rack, and means to shift said indexing rack to index the gear blank.

2. In a machine of the character described, the combination of a support, a rotary cutter thereon, a table on said support, a feed screw for said table, a carrier mounted on said table, an arbor on said carrier adapted to receive a gear blank, a master gear on said arbor, a curved rack on said support meshing with said master gear, and means to connect said feed screw with said table and carrier alternatively to feed said table and oscillate said carrier.

3. In a machine of the character described, the combination of a support, a rotary cutter thereon, a table on said support, a feed screw for said table, a carrier mounted on said table, an arbor on said carrier adapted to receive a gear blank, a master gear on said arbor, a curved rack meshing with said master gear, a slide on said table, means connecting said slide with said carrier, a nut on said screw connected to said slide, and means to secure said slide to or release the same from said table, to thereby feed either the slide and table or the slide alone.

4. In a machine of the character described, the combination of a support, a rotary cutter thereon, a table on said support, a feed screw for said table, an oscillatory carrier mounted on said table and having an arbor thereon adapted to receive a gear blank, a master gear on said arbor, a curved rack meshing with said master gear, and means to oscillate said carrier including a slide on said table movable independently thereof, a rack operated by said slide and a toothed sector connected to said carrier and meshing with said rack.

5. In a machine of the character described, the combination of a support, a rotary cutter thereon, a table on said support, a feed screw for said table, an oscillatory carrier mounted on said table and having an arbor thereon adapted to receive a gear blank, a curved rack, a master gear on said arbor to mesh with said rack, and means including gear connections between said screw and carrier to oscillate said carrier.

6. In a machine of the character described, the combination of a support, a rotary cutter thereon, a carrier swingingly mounted on said support, an arbor on said carrier adapted to receive a gear blank, a master gear on said arbor, a normally fixed rack meshing with said master gear, a feed screw on said support, means connecting said screw with said carrier to rock the latter, and means to reverse the direction of rotation of said screw to change the direction of movement of said carrier.

7. In a machine of the character described, the combination of a rotary cutter, means to support a gear blank in position to be acted upon by said cutter, means to oscillate said support, a curved rack and master gear to roll said blank over said cutter as the latter is oscillated to generate an involute tooth space, a curved indexing rack to mesh with said master gear, and means automatically to shift the indexing rack after the master gear has rolled from its rack into mesh with the indexing rack.

8. In a machine of the character described, the combination of a rotary cutter, means to support a gear blank in position to be acted upon by said cutter, means to oscillate said support, a curved rack and master gear to roll said blank over said cutter as the latter is oscillated to generate an involute tooth space, an indexing rack adapted to mesh with the master gear, a cam to shift said rack, a pinion connected to said cam, a slide, a rack thereon meshing with said pinion, a pair of dogs on said slide, and a member on said oscillatory support to engage said dogs and shift said rack slide to cause said cam to shift the indexing rack and turn the master gear an increment to index the gear blank.

9. In a machine of the character described, the combination of a rotary cutter, means to support a gear blank in position to be acted upon by said cutter, means to oscillate said support, a curved rack and master gear to roll said blank over said cutter as the latter is oscillated to generate an involute tooth space, and means automatically to index the blank including an indexing rack to mesh with the master gear, and a cam to impart an indexing movement to said indexing rack.

10. In a machine of the character described, the combination of a rotary cutter, means to support a gear blank in position to be acted upon by said cutter, means to oscillate said support, a curved rack and master gear to roll said blank over said cutter as the latter is oscillated to generate an involute tooth space, and means automatically to index the blank including an indexing rack, an actuating cam for the latter, and means to turn the cam in opposite directions as the blank support oscillates in opposite directions, said cam being formed to shift the indexing rack in the same direction when said cam is turned in opposite directions.

11. In a machine of the character described, the combination of a rotary cutter, means to support a gear blank in position to be acted upon by said cutter, means including a master gear to roll the gear blank over the cutter to generate involute teeth thereon, and means including a rack to engage the master gear and a cam to actuate said rack to index the blank.

12. In a machine of the character described, the combination of a rotary cutter, means including a master gear to roll a gear blank over the cutter to generate involute teeth thereon, and means to index the blank including a rack to engage the master gear, a cam to actuate the rack, and spring means to hold the rack in operative relation to the cam.

13. In a machine of the character described, the combination of a rotary cutter, means to support a gear blank in position to be acted upon by the cutter, and means to index the blank including a master gear, an index rack to mesh therewith, cam means to impart an indexing movement to said rack, and means to reset the rack for readiness again to index the blank.

14. In a machine of the character described, the combination of a rotary cutter, a gear blank support, means to move said support to roll the blank over the cutter, and means to index the blank including a master gear, an index rack to mesh with said gear, and cam means operated by movement of said support to shift said rack and index the blank.

15. In a machine of the character described, the combination of a rotary cutter, a gear blank support, a master gear for connection with the blank, a curved rack, a pair of index racks at the ends of said curved rack, means to oscillate said support to roll the master gear along said curved rack and to and from said index racks, and means automatically to shift said index racks when the master gear is thereon to index the blank.

16. In a machine of the character described, the combination of a rotary cutter, a gear blank support, a master gear for connection with the blank, a rack, means to roll the master gear along said rack to generate involute teeth on the blank, a pair of indexing racks at the ends of said master gear rack adapted to mesh with the master gear when the latter rolls off from the master gear rack, a slide having a pair of dogs thereon, a rack on said slide, a gear meshing with said rack, a cam turned by said gear to shift the indexing racks, an actuating member on the blank support to shift said dogs to operate said rack slide and turn the cam, a pair of fixed elements, and a rocking lever on said slide moved by said actuating member into engagement with said elements to reset said slide and index racks in readiness for indexing operations.

17. In a machine of the character described, the combination of a support, a table thereon, a feed screw for said table, a slide, a nut on said screw connected to said slide, means to secure said slide to said table at will to feed the latter through said slide, and means to secure said table to said support at will, that the slide may be fed by the screw independently of the table.

18. In a machine of the character described, the combination of a standard, a knee thereon, a table on said knee, a spindle on said standard carrying a gear cutter, a slide on said standard, a member detachably secured to said slide supporting a curved normally fixed rack and a pair of curved index racks; a bevel gear attachment adapted to be mounted on said table comprising an oscillatory carrier, an arbor obliquely mounted thereon and adapted to secure a gear blank and a master gear on said arbor to mesh with said racks; and means to oscillate said carrier.

19. In a machine of the character described, the combination of a standard, a knee thereon, a table on said knee, a spindle on said standard for a cutter, a feed screw, a slide on said table having a nut receiving said screw, means to rotate said screw including oppositely driven gears and a clutch, a bar slidably supported by said table, dogs on said bar to actuate the clutch, means connecting said slide with said bar to move the latter to operate said clutch, and means to secure the slide to or release the same from said table at will.

20. In a machine of the character described, the combination of a standard, a knee thereon, a table on said knee, a spindle on said standard for a rotary cutter, a carrier for a gear blank on said table, a slide on said table having a rack thereon, a gear element connected to the carrier and meshing with the rack, a feed screw, means alternatively to render said screw effective to feed said slide or table, oppositely driven gears mounted on said knee, a clutch to render either of said gears effective, and means to shift said clutch including a member fed by said slide and having dogs thereon.

21. In a machine of the character described, the combination of a rotary cutter, an arbor, a gear blank on said arbor, a master gear on said arbor, a spacing collar on said arbor having ribs or projections on opposed ends thereof to engage said blank and gear and permit self alinement of the same on said arbor, and means to support said arbor in position for the cutter to act on said blank.

22. In a machine of the character described, the combination of a rotary cutter, an arbor having a bearing at one end thereof and a shoulder between the ends of the arbor to receive the gear blank, a master gear on the arbor, a spacing collar loose on the arbor between the blank and gear and having fulcrum elements to engage the blank and gear that the collar may have slight rocking movement on said arbor and allow the parts to aline themselves on the arbor, a nut threaded to one end of the arbor and having a bearing thereon, and a support for the arbor having members to engage said bearings.

23. In a machine for cutting bevel gears, the combination of a support, a rotary cutter thereon, a carrier swingingly mounted on said support, an arbor supported by said carrier at an acute angle to the axis of said cutter, a gear blank supported by said arbor in position to have teeth cut therein, means for rocking said carrier to either side of the cutting position sufficiently to move the blank clear of the cutter, and means automatically to index the blank as it is moved clear of the cutter upon either side of the cutting position.

24. In a machine for cutting bevel gears, the combination of a support, a rotary cutter thereon, a carrier swingingly mounted on said support and arranged to support a gear blank in position to be cut by said cutter, a master gear to roll said blank over said cutter, a rack coöperating with said gear, means for rocking said carrier upon either side of the gear cutting position a sufficient distance to disengage the blank from the cutter and the gear from its rack, and means for automatically indexing said gear when said carrier is swung to either side of the gear cutting position.

25. In a machine for cutting bevel gears, the combination of a support, a rotary cutter thereon, a carrier swingingly mounted on said support and arranged to support a gear blank in position to be cut, means for rocking said carrier to either side of the gear cutting position sufficiently to move the blank clear of the cutter, and means for indexing said gear when moved to either side of said cutting position.

26. In a machine of the character described, the combination of a support, a rotary cutter thereon, a table slidably mounted on said support, a carrier swingingly mounted on said table and arranged to support a gear blank in position to be cut, a feed screw for moving said table, means for locking said table against movement, means for rocking said carrier including a toothed sector and a sliding rack, and means operable by the rotation of said screw to impart sliding movement to said rack.

27. In a machine of the character described, the combination of a rotary cutter, a shaft to carry a blank to be acted on by the cutter, bearings for the ends of said shaft, and means to oscillate said shaft about its longitudinal axis and oscillate said shaft about one of said bearings on an axis intersecting said longitudinal axis, thereby to generate from said blank a bevel gear having involute teeth.

In testimony whereof I have signed my name to this specification.

WILLIAM C. FARNUM.